United States Patent [19]

Miyao et al.

[11] 4,250,821

[45] Feb. 17, 1981

[54] BUTTONHOLE STITCH CONTROL IN AN AUTOMATIC ELECTRONIC SEWING MACHINE

[75] Inventors: Nobuyoshi Miyao, Sakurai; Hirotoshi Matsui, Nara; Nobukazu Isoyama, Sakurai; Susumu Nonaka, Yamatokoriyama; Masayasu Makino, Gose; Kazuo Suzuki, Higashiosaka; Hirokazu Koda, Dose, all of Japan

[73] Assignee: Sharp Kabushiki Kaisha, Osaka, Japan

[21] Appl. No.: 924,560

[22] Filed: Jul. 14, 1978

[30] Foreign Application Priority Data

Jul. 15, 1977 [JP] Japan .................................. 52-85272
Jul. 15, 1977 [JP] Japan .................................. 52-85273

[51] Int. Cl.³ .......................... D05B 3/06; D05B 3/02
[52] U.S. Cl. ............................. 112/158 B; 112/158 E
[58] Field of Search ................ 112/158 B, 158 E, 65, 112/210, 121.11, 121.12

[56] References Cited

U.S. PATENT DOCUMENTS

| | | | |
|---|---|---|---|
| 3,799,084 | 3/1974 | Furnari | 112/210 X |
| 4,016,821 | 4/1977 | Minalga | 112/158 E |
| 4,056,070 | 11/1977 | Hauf | 112/158 B |
| 4,084,524 | 4/1978 | Hasegawa | 112/158 B |
| 4,106,418 | 8/1978 | Hayashi | 112/158 B |

*Primary Examiner*—Peter P. Nerbun
*Attorney, Agent, or Firm*—Birch, Stewart, Kolasch & Birch

[57] ABSTRACT

In an automatic electronic sewing machine including a read only memory (ROM) and a random access memory (RAM), the read only memory (ROM) stores pattern data for performing buttonhole stitch operation in the forward direction and pattern data for performing buttonhole stitch operation in the backward direction. A first control switch functions to conduct the buttonhole stitch operation in the forward direction by a desired length selected by the operator. A storage means is provided for storing the length information of the buttonhole stitch formation in the forward direction, or the repetition number of a unit pattern in the forward direction. A second control switch functions to conduct the buttonhole stitch operation in the backward direction by the length stored in the storage means.

18 Claims, 16 Drawing Figures

| | X | Y |
|---|---|---|
| ACm → | 13 | 17 |
| | 4 | 17 |
| | 13 | 17 |
| | 4 | 17 |
| | ⋮ | |
| | 13 | 17 |
| | 4 | 17 |
| ACn → | 25 | 17 |
| | 4 | 15 |
| | 25 | 15 |
| | 4 | 15 |
| | 25 | 15 |

FIG. 9

| | X | Y |
|---|---|---|
| ACm' → | 16 | 13 |
| | 25 | 13 |
| | 16 | 13 |
| | 25 | 13 |
| | ⋮ | |
| | 16 | 13 |
| | 25 | 13 |
| ACn' → | 4 | 15 |
| | 25 | 15 |
| | 4 | 15 |
| | 25 | 15 |
| | 4 | 15 |

BUTTONHOLE STITCH CONTROL IN AN AUTOMATIC ELECTRONIC SEWING MACHINE

BACKGROUND AND SUMMARY OF THE INVENTION

The present invention relates to an automatic electronic sewing machine and, more particularly, to a digitalized buttonhole switch control in an automatic electronic sewing machine.

An automatic electronic sewing machine including a read only memory (ROM) and a random access memory (RAM) is proposed in copending application, AUTOMATIC ELECTRONIC SEWING MACHINE, Ser. No. 843,639, filed Oct. 19, 1977 by Tousaku Nakanishi, Kazuo Suzuki, Masayasu Makino, Nobuyoshi Miyao and Hirokazu Koda and assigned to the same assignee as the present application.

In the conventional automatic electronic sewing machine such as disclosed in the above-mentioned U.S. patent application Ser. No. 843,639, buttonhole stitch formation is controlled through the use of a guide plate which determines the button size. Therefore, buttonhole stitch formation is difficult to perform in the conventional automatic electronic sewing machine.

Accordingly, an object of the present invention is to provide a digital control system for performing buttonhole stitch formation in an automatic electronic sewing machine. Another object of the present invention is to facilitate buttonhole stitch formation in an automatic electronic sewing machine.

Other objects and further scope of appicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a read only memory (ROM) stores digital data for conducting buttonhole operation. More specifically, the read only memory (ROM) includes two subsections one for storing digital data related to the stitch pattern in the forward direction of the buttonhole, and the other for storing digital data related to the stitch pattern in the backward direction of the buttonhole.

A first control instruction derived from a keyboard unit functions to conduct the buttonhole stitch formation in the forward direction in accordance with the digital data stored in the read only memory (ROM). The length of the stitch formation in the forward direction is manually selected by the operator. A storage means is provided for storing the information related to the length of the buttonhole stitch formation in the forward direction, or the repetition number of a unit zigzag pattern in the forward direction.

A second control instruction derived from the keyboard unit functions to conduct the buttonhole stitch formation in the backward direction in accordance with the digital data stored in the read only memory (ROM). The length of the stitch formation in the backward direction is automatically limited to the length corresponding to the information stored in the storage means.

In a preferred form, indication means are provided for indicating whether the buttonhole operation is now conducted in the forward direction or in the backward direction.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

(I) CONTROL PANEL

Figure 1:
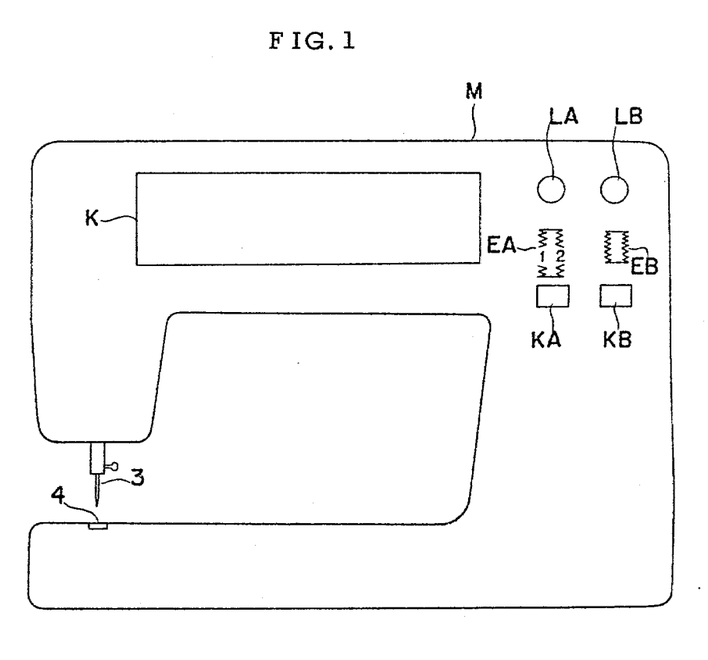
FIG. 1 is a schematic front view of an embodiment of an automatic electronic sewing machine of the present invention.

FIG. 1 shows an embodiment of an automatic electronic sewing machine of the present invention and, more specifically, shows a control panel of the electronic sewing machine of the present invention.

An automatic electronic sewing machine body M includes indication lamps LA and LB for indicating a manual buttonhole operation mode and an automatic buttonhole operation mode, respectively. A manual mode selection switch KA is provided adjacent to a label EA for conducting the buttonhole operation in the manual mode. An automatic mode selection switch KB is provided adjacent to a label EB for conducting the buttonhole operation in the automatic mode. The body M further includes a keyboard panel K which includes various stitch pattern selection keys and control instruction selection keys as disclosed in copending application, AUTOMATIC ELECTRONIC SEWING MACHINE, Ser. No. 843,639, filed Oct. 19, 1977 by Tousaku Nakanishi, Kazuo Suzuki, Masayasu Makino, Nobuyoshi Miyao and Hirokazu Koda and assigned to the same assignee as the present application.

(II) MECHANICAL PORTION

Figures 2, 3:
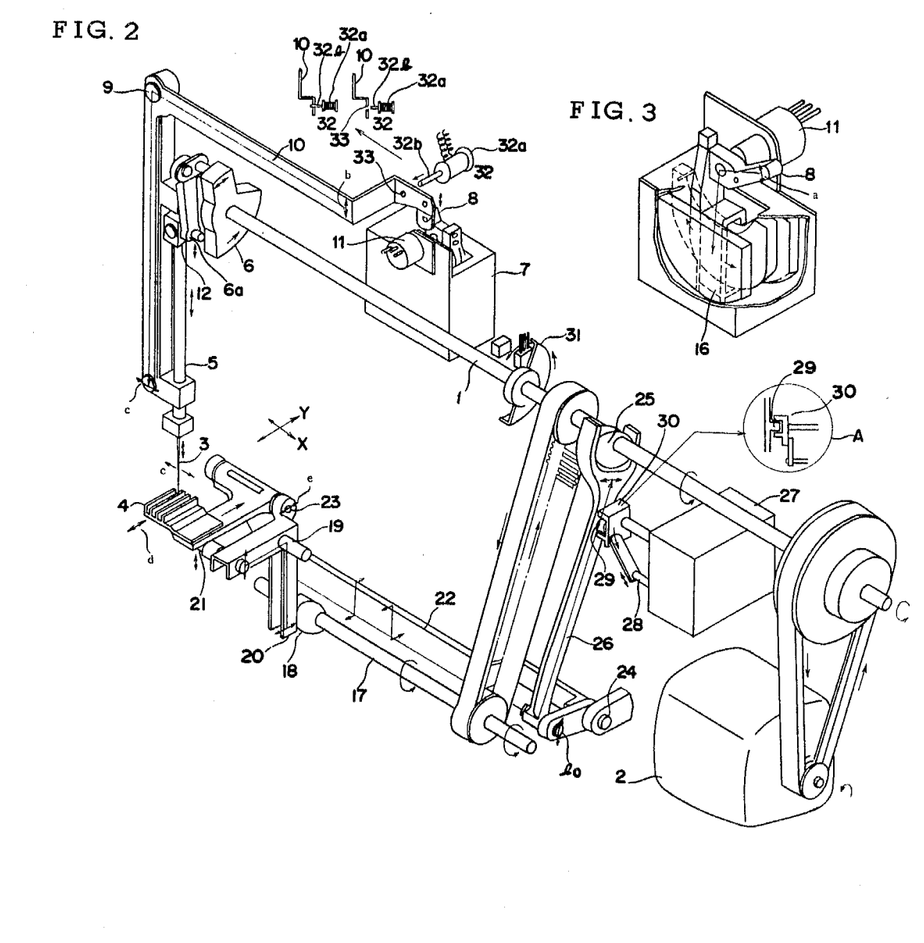
FIG. 2 is a perspective view of an essential part of a mechanical portion of the automatic electronic sewing machine of FIG. 1.
FIG. 3 is a perspective view of a linear motor employed within the mechanical portion of FIG. 2.

FIG. 2 shows a mechanical portion of the automatic electronic sewing machine of the present invention.

A main shaft 1 is driven to rotate by a motor 2. A needle 3 is driven to reciprocate through a needle shaft 5, and a crank shaft 6 associated with the main shaft 1. A work feed plate 4 is provided for feeding the work.

A linear motor 7 is provided for positioning the needle 3 at a desired position through the needle shaft 5. An output arm 8 of the linear motor 7 is associated with one end of an L-shaped lever 10 which is rotatably supported around a pin 9. The other end of the L-shaped lever 10 is connected to the needle shaft 5.

When the output arm 8 of the linear motor 7 is rotated in the direction shown by the arrow a of FIG. 3, the L-shaped lever 10 is rotated around the pin 9 in the direction shown by the arrow b. With this rotation the position of the needle 3 is shifted along the X-axis as shown by the arrow c. The position of the needle 3 is detected by a potentiometer 11 which rotates in unison with the arm 8 of the linear motor 7.

Figure 4:
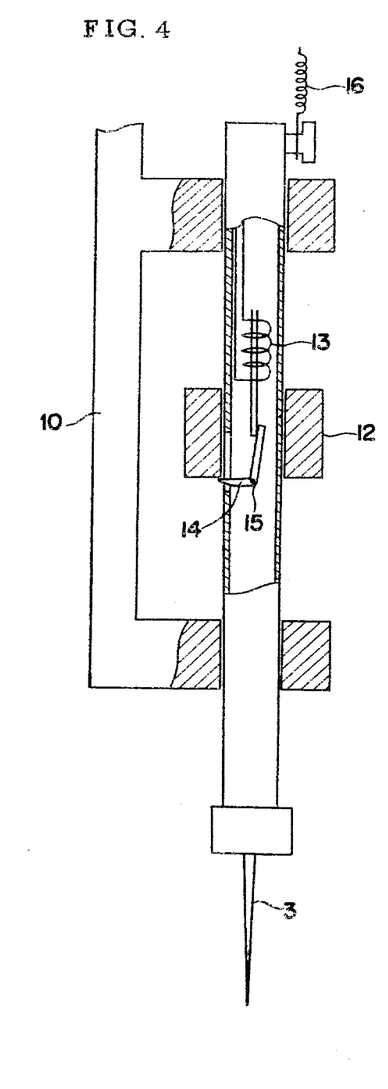
FIG. 4 is a partially sectional view of a needle penetration drive mechanism employed within the mechanical portion of FIG. 2, wherein a clutch mechanism is in the ON condition.
Figure 5:
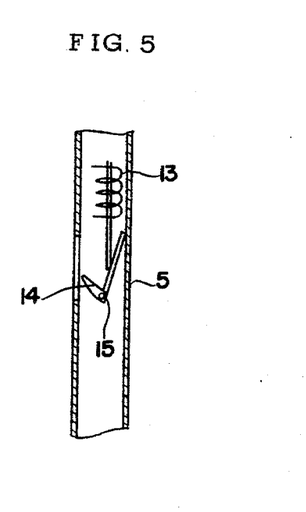
FIG. 5 is a sectional view of the clutch mechanism employed within the needle penetration drive mechanism of FIG. 4, wherein the clutch mechanism is in the OFF condition.

A clutch cylinder 12 is slidably secured around the needle shaft 5 as shown in FIGS. 4 and 5. A clutch solenoid 13 and a clutch click 14 are disposed within the needle shaft 5. The clutch click 14 is rotatably secured around a pin 15, and one end of the clutch click 14 can be extruded outside through the surface of the needle shaft 5. The clutch cylinder 12 is connected to an arm $6_a$ of the crank shaft 6.

When the clutch solenoid 13 is energized, the one end of the clutch click 14 is placed within the needle shaft 5 as shown in FIG. 5. The clutch click 14 is not engaged with the clutch cylinder 12 and, therefore, the clutch cylinder 12 is reciprocated by the crank shaft 6 without transporting the reciprocating movement to the needle shaft 5. The needle shaft 5 is positioned at the uppermost position by a spring 16.

When the clutch solenoid 13 is deenergized, the one end of the clutch click 14 is extruded through the surface of the needle shaft 5 as shown in FIG. 4. The extruded end of the clutch click 14 is engaged with the bottom surface of the clutch cylinder 12, whereby reciprocating movement of the clutch cylinder 12 is transported to the needle shaft 5. The needle shaft 5 is driven to travel downward by the clutch cylinder 12, and driven to travel upward by the spring 16. That is, when the clutch solenoid 13 is deenergized, the needle shaft 5 reciprocates in response to the rotation of the crank shaft 6. This condition is referred to as the condition where the clutch 12 is ON hereinafter. Contrarily, when the clutch solenoid 13 is energized, the needle shaft 5 is stationary at its uppermost position without regard to the rotation of the crank shaft 6. This condition is referred to as the condition where the clutch 12 is OFF, hereinafter.

A work feed drive shaft 17 rotates in sychronization with the main shaft 1. A cam 18 is secured to the work feed drive shaft 17 for driving the work feed plate 4 to move downward and upward in synchronization with the rotation of the main shaft 1. The bottom surface of the work feed plate 4 is supported by an arm 21, which is communicated to the cam 18 via an L-shaped lever 20 which is rotatably around a pin 19.

An arm 22 is provided for shifting the location of the work feed plate 4 along the Y-axis, or, in the direction shown by the arrow d. One end of the arm 22 is communicated to a shaft 23 which rotatably supports the feed plate 4, and the other end of the arm 22 is rotatably secured to a pin 24. The other end of the arm 22 is also rotatably communicated to an arm 26 which is engaged with a cam 25 fixed to the main shaft 1. A protrusion 29 is secured to the arm 26. The protrusion 29 is slidably associated with a C-shaped guide 30, which is rotatably connected to an output arm 28 of a linear motor 27 for determining the shift length of the work feed plate 4. The engaged condition of the protrusion 29 and the C-shaped guide 30 is shown in the circular A of FIG. 2.

When the groove of the C-shaped guide 30 is substantially parallel with the course of movement of the protrusion 29 which rotates around a fulcrum $l_o$, the position of the fulcrum $l_o$ is not changed even when the arm 26 changes its position in response to the rotation of the cam 25. When the C-shaped guide 30 is rotated by the linear motor 27 so that the groove of the C-shaped guide 30 crosses the course of movement of the protrusion 29 with a certain angle, the arm 26 is shifted its location in response to the rotation of the cam 25 in such a manner that the protrusion 29 is forced to accommodate the groove of the C-shaped guide 30.

The shift operation of the arm 26 functions to rotate the arm 22 around the pin 24, whereby the shaft 23 is shifted its position in the direction shown by the arrow e by the length corresponding to the rotation value of the arm 22. In this way, the work feed plate 4 is shifted along the Y-axis by a desired length. The shift value is controlled by the linear motor 27 and the shift operation is synchronized with the rotation of the main shaft 1. The shift operation of the work feed plate 4 along the Y-axis is conducted when the work feed plate 4 is pushed upward by the arm 21. A synchronization signal generator 31 is fixed to the main shaft 1 so that a synchronization signal $\beta$ is developed in synchronization with the penetration operation of the needle 3. When the clutch 12 is ON and the needle 3 is positioned above the work, the synchronization signal $\beta$ bears the high level, or $\beta = 1$. When the point of the needle 3 is positioned below the work, $\beta = 0$. When the clutch 12 is OFF, the needle 3 is stationary at the uppermost position and the synchronization signal $\beta$ is developed in synchronization with the rotation of the main shaft 1.

A stopper 32 functions to lock the needle 3 at the center of the shift range of the needle 3 along the X-axis. The stopper 32 comprises a stationary solenoid $32a$ and a plunger $32b$. The plunger $32b$ is inserted into a hole 23 formed in the lever 10 in order to lock the lever 10 at a predetermined position. Therefore, the needle 3 is locked at the center of the shift range of the needle 3 when the plunger $32b$ is inserted into the hole 33.

The stitches are formed by the penetration operation of the needle 3 as in the case of the conventional sewing machine. The stitch formation speed is controllable by the depression force applied to a foot switch as in the case of the conventional sewing machine.

(III) SUMMARY OF THE CONTROL SYSTEM

Figure 6A:
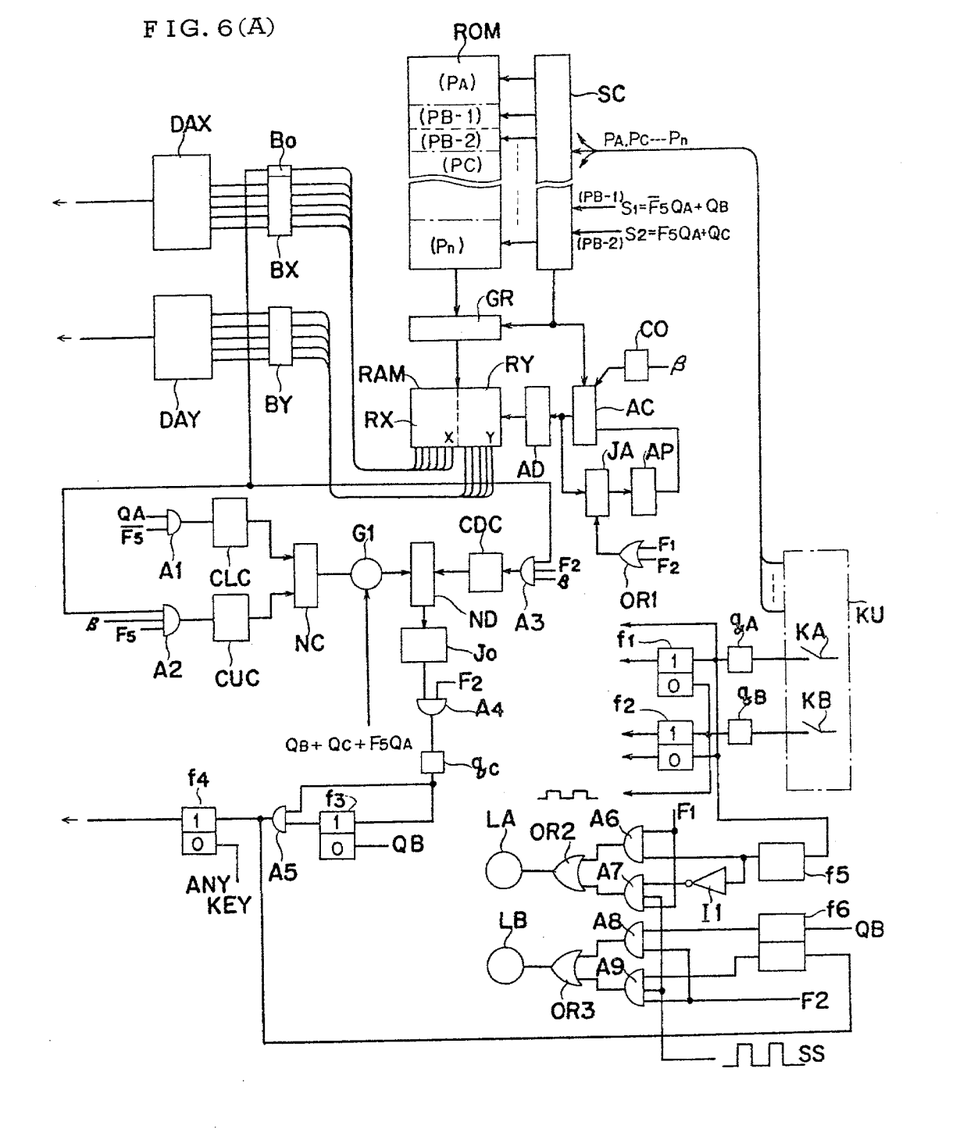
FIG. 6(A) and 6(B) are block diagrams of an embodiment of a control system of an automatic electronic sewing machine of the present invention.
Figure 6B:
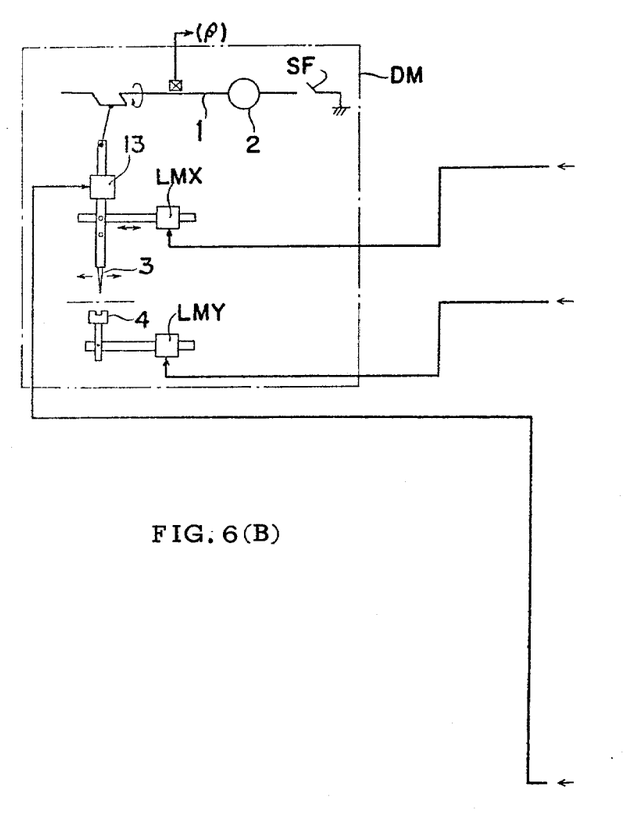

FIGS. 6(A) and 6(B) show an embodiment of a control system of the present invention.

DM represents the above-discussed mechanical portion of the automatic electronic sewing machine. The control system is incorporated in an LSI (large scale integrated circuit). A read only memory ROM stores digital data related to various stitch patterns. Desired stitch pattern information is read out in accordance with selection operation conducted through the selection keys. The thus read out pattern information is introduced into a random access memory RAM, and temporarily stored therein.

Figure 7:
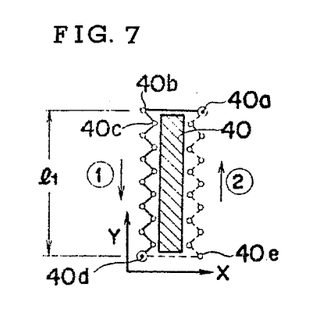
FIG. 7 is a plan view of a buttonhole stitch pattern.
Figure 8:
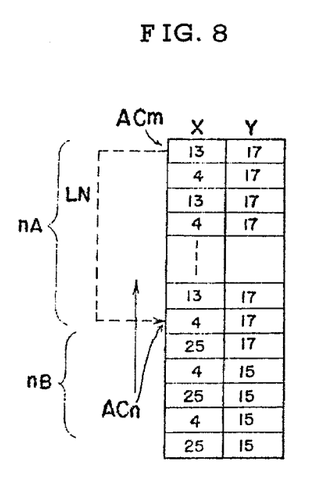
FIGS. 8 and 9 are charts showing digital data stored in a read only memory (ROM) for conducting buttonhole operation.

The thus stored pattern information corresponds to the selected stitch pattern. For example, when the buttonhole stitch as shown in FIG. 7 is selected, the digital information related to the buttonhole stitch as shown in FIG. 8 is introduced into the random access memory RAM. The pattern data indicate the positioning coordinates of the respective stitches along the X-axis and the Y-axis. The X section represents the position coordinates of the needle 3, and the Y section represents feed values of the work feed plate 4.

The pattern data stored in the RAM are developed step by step in synchronization with the synchronization signal $\beta$ and converted into analog signals for shifting the needle 3 and the work feed plate 4 for achieving the stitch formation at predetermined positions.

The shift operation of the needle 3 and the work feed plate 4 is conducted when the needle 3 is separated from the work.

(IV) STITCH COORDINATES

Figure 12:
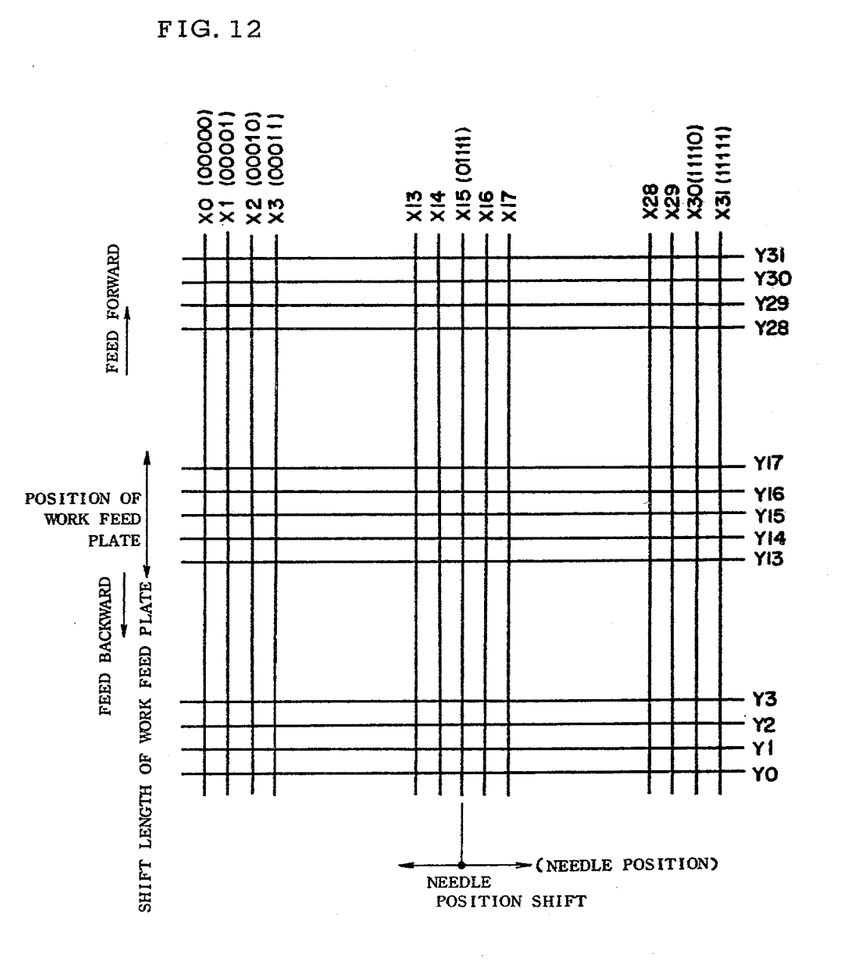
FIG. 12 is a chart showing coordinates of a needle position and a work feed plate position.

The needle position can be selected from thirty-two (32) positions $X_0$ through $X_{31}$, and the work position can be selected from thirty-two (32) positions $Y_0$ through $Y_{31}$. That is, the stitch pattern can be formed in a matrix of $32 \times 32$ as shown in FIG. 12.

More specifically, the RAM stores the positioning information in the following manner.

| X COORDINATES | NEEDLE POSITION | RAM DATA |
|---|---|---|
| $X_0$ | maximum shift in the positive direction | 00000 |
| . | . | . |
| . | . | . |
| . | . | . |
| $X_{15}$ | center | 01111 |
| . | . | . |
| . | . | . |
| . | . | . |
| $X_{31}$ | maximum shift in the negative direction | 11111 |
| Y COORDINATES | WORK FEED PLATE POSITION | RAM DATA |
| $Y_0$ | maximum feed in the negative direction | 00000 |
| . | . | . |
| . | . | . |
| . | . | . |
| $Y_{15}$ | center | 01111 |
| . | . | . |
| . | . | . |
| . | . | . |
| $Y_{31}$ | maximum feed in the positive direction | 11111 |

(V) CONSTRUCTION OF CONTROL SYSTEM

Referring again to FIGS. 6(A) and 6(B), the control system mainly comprises a key input unit KU including the stitch pattern selection keys (not shown), the manual mode buttonhole operation selection key KA and the automatic mode buttonhole operation selection key KB.

Figure 9:
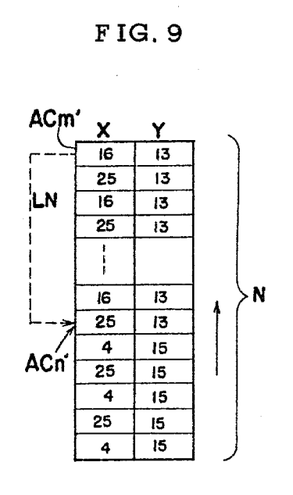

The read only memory ROM includes plural sections PA, PB-1, PB-2, PC,___, and Pn, each of which stores pattern data of different kinds. The pattern data stored in the read only memory ROM are read out in accordance with selection commands derived from a ROM section selection circuit SC, and the thus read out pattern data are introduced into the random access memory RAM through a gate circuit GR. The section PB-1 of the read only memory ROM stores the pattern data related to the buttonhole operation in the forward direction (in the direction ① of FIG. 7) as shown in FIG. 8. The section PB-2 stores the pattern data related to the buttonhole operation in the backward direction (in the direction ② of FIG. 7) as shown in FIG. 9.

The random access memory RAM includes sections RX and RY for storing the pattern data in the X-direction and the Y-direction, respectively.

An address register AC is associated with the random access memory RAM for addressing the random access memory RAM via an address decoder AD. The address register AC is controlled to count up upon every provision of the synchronization signal $\beta$ which is developed in synchronization with the penetration operation of the needle 3 driven by a foot switch SF. That is, an address register incrementing circuit CO is connected to receive the synchronization signal $\beta$ for increasing the contents stored in the address register AC in response to the synchronization signal $\beta$.

Output signals of the random access memory RAM are temporarily stored in registers BX and BY, respectively. The register BX comprises six (6) bits. The first bit $B_O$ stores information "1" when a section nA of the buttonhole data shown in FIGS. 8 and 9 are addressed, and stores information "0" when another section nB of the buttonhole data are addressed. The digital data temporarily stored in the register BX are converted into an analog signal by a digital-to-analog converter DAX and applied to a linear motor LMX for swinging the needle 3 in the X-direction. The digital data temporarily stored in the register BY are converted into an analog signal by a digital-to-analog converter DAY and applied to a linear motor LMY for driving the work feed plate 4 in the Y-direction.

A judge circuit JA is connected to receive the output signal of the address register AC for developing a detection output "1" when the last address ACm of the random access memory RAM shown in FIG. 8 is selected by the address register AC. The judge circuit JA is placed in the operative condition only when a set output signal $F_1$ of a flip-flop $f_1$ or a set output signal $F_2$ of a flip-flop $f_2$ is applied through an OR gate $OR_1$. The detection output of the judge circuit JA is applied to an address determination circuit AP in order to set the address of the address register AC at the address $AC_n$ shown in FIG. 8.

A register NC is provided for storing the stitch number of the buttonhole stitch when the buttonhole operation is conducted in the direction ① shown in FIG. 7. A count-up circuit CUC is provided for increasing the contents stored in the register NC, and a clear circuit CLC is provided for clearing the contents stored in the register NC. The counted contents stored in the register NC are applied through a gate $G_1$ to a register ND. A count-down circuit CDC is provided for decreasing the contents stored in the register ND. A judge circuit JO is connected to the register ND in order to develop a detection output "1" when the contents stored in the register ND are "0".

The control system further comprises flip-flops $f_3$ through $f_6$, which develop set output signals $F_3$ through $F_6$, respectively, AND gates $A_1$ through $A_9$, OR gates $OR_1$ through $OR_3$, an inverter $I_1$, and one-shot pulse generators qA, qB and qC, which develop output signals QA, QB and QC, respectively.

The indication lamp LA is connected to receive a drive signal through the AND gates $A_6$ and $A_7$, which are connected to receive the set output signal $F_1$ derived from the flip-flop $f_1$, which is set when the manual mode buttonhole operation is performed. The AND gate $A_6$ further receives the set output signal $F_5$ of the flip-flop $f_5$, which is placed in the set condition when the buttonhole operation is conducted in the forward direction, or in the direction ① of FIG. 7. The AND gate $A_7$ further receives an inverted set output signal $\overline{F_5}$ through the inverter $I_1$, and a pulse signal SS of a predetermined frequency. The output signals of the AND gates $A_6$ and $A_7$ are applied to the indication lamp LA through the OR gate $OR_2$.

The indication lamp LB is connected to receive a drive signal through the AND gates $A_8$ and $A_9$. The AND gates $A_8$ and $A_9$ receive the set output signal $F_2$ derived from the flip-flop $f_2$, which is set when the automatic mode buttonhole operation is performed. The AND gate $A_8$ further receives the set output signal $F_6$ of the flip-flop $f_6$. The AND gate $A_9$ further receives a reset output signal of the flip-flop $f_6$ and the pulse signal ss. The output signals of the AND gates $A_8$ and $A_9$ are applied to the indication lamp LB through the OR gate $OR_3$.

(VI) OPERATION

Now assume that the flip-flops $f_1$ and $f_2$ are in the reset states. When the manual mode buttonhole operation selection key KA is depressed, the one-shot pulse generator qA develops the one-shot pulse signal QA to set the flip-flop $f_1$. A signal $S_1$ is developed under the condition $\overline{F_5} \cdot QA$ before the T-type flip-flop $f_5$ is set, whereby the ROM section selection circuit SC selects the section PB-1, which stores the buttonhole data in the direction ①. By this selection, the data shown in FIG. 8 stored in the section PB-1 of the read only memory ROM are transferred to the random access memory RAM through the gate circuit GR.

The inverted set output signal $\overline{F_5}$ and the one-shot pulse signal QA are applied to the AND gate $A_1$ to clear the counter NC through the clear circuit CLC. The flip-flop $f_5$ is set by the one-shot pulse signal QA. The set output signals $F_1$ and $F_5$ of the flip-flops $f_1$ and $f_5$ are applied to the AND gate $A_6$ to continuously enable the indication lamp LA. Under these conditions, when the foot switch SF is actuated, the main shaft 1 is driven to rotate by the motor 2, whereby the synchronization signal $\beta$ is developed.

The address data stored in the address register AC are applied to the random access memory RAM. The bottommost data shown in FIG. 8 are read out, that is, the data "25" and "15" are introduced into the registers BX and BY, respectively. The linear motor LMX rotates by the value corresponding to the data "25", and the needle 3 penetrates the uppermost end $40_a$ of a buttonhole 40 shown in FIG. 7, thereby forming the first stitch. When the needle 3 is separated from the work in response to the rotation of the main shaft 1, the synchronization signal $\beta$ is developed to increase the contents of the address register AC by one. The second data stored in the random access memory RAM, that is, the second data from the botton of FIG. 8 "4" and "15" are introduced into the registers BX and BY, respectively. The needle 3 is shifted left by the amount corresponding to the data "4", and the stitch is formed at a point $40_b$ of FIG. 7. At this moment the work feed plate 4 is not driven to move because the data in the Y-direction are "15".

The similar operation is repeated to form plural stitches at the uppermost end of the buttonhole 40. When the contents of the address register AC reach the data corresponding to the address $AC_n$ shown in FIG. 8, the bit $B_o$ of the register BX receives the signal "1", which shows that the RAM section is advanced from the section nB to the section nA. The signal "1" derived from the bit $B_o$ is applied to the AND gate $A_2$, which functions to apply the synchronization signal $\beta$ to the count-up circuit CUC. Therefore, the contents of the register NC are increased one by one in response to the provision of the synchronization signal.

Figure 10:
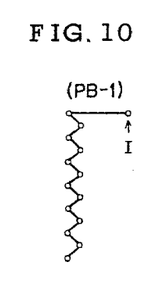
FIGS. 10 and 11 are charts of a buttonhole stitch pattern.

The data stored in the section nA of the random access memory RAM shown in FIG. 8 are read out. The needle 3 is driven to swing between two positions corresponding to the data "4" and "13", respectively. And the work feed plate 4 is driven to move by two pitches for every stitch. Therefore, the stitches are formed at points $40_b$ and $40_c$ on the side ① of FIG. 7. That is, the zigzag stitch pattern is formed as shown in FIG. 10. During these operations, the indication lamp LA is continuously enabled to indicate that the buttonhole operation is conducted in the direction ①.

When the contents of the address register AC reach the last address $AC_m$ of FIG. 8, the judge circuit JA develops the detection output toward the address determination circuit AP to set the contents of the address register AC at a value corresponding to the address $AC_n$. The formation of the zigzag stitch pattern on the side ① of FIG. 7 is repeated as long as the foot switch SF is actuated.

Since the judge circuit JA is controlled by the set output signal $F_1$ or $F_2$ applied through the OR gate $OR_1$, the above-mentioned repeat operation is performed only when the buttonhole operation is selected.

When the zigzag stitch pattern is formed in the direction ① by a desired length, the foot switch SF is released and the manual mode buttonhole operation selection key KA is again depressed. Now assume that the stitch formation is conducted to a point $40_d$ of FIG. 7 at this moment. The one-shot pulse generator qA again develops the output signal QA. A signal $S_2$ is applied to the ROM section selection circuit SC to select the section PB-2. Thereafter, the flip-flop $f_5$ is reset to turn on the AND gate $A_7$ and to turn off the AND gate $A_6$. Accordingly, the indication lamp LA is driven to flicker at a frequency determined by the pulse signal SS.

The data stored in the section PB-2 of the read only memory ROM is transferred to the random access memory RAM. That is, the random access memory RAM stores the pattern data shown in FIG. 9. The gate $G_1$ is turned on by a signal $F_5 \cdot QA$, whereby the contents stored in the register NC are transferred to the register ND. The contents stored in the register NC remain in the register NC.

Figure 11:
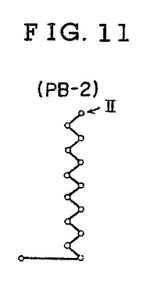

When the foot switch SF is again actuated, the contents of the address register AC are increased upon every provision of the synchronization signal $\beta$. The data stored in the random access memory RAM shown in FIG. 9 are read out from the botton. Accordingly, the stitches are formed between the points $40_d$ and $40_e$ of FIG. 7 by the data stored in the section below the address $AC_n$, of FIG. 9, and the zigzag stitches are formed between the points $40e$ and $40a$ in the direction ② of FIG. 7 by the data stored between the addresses $AC_n'$ and $AC_m'$ of FIG. 9. That is, the stitches are formed at the side ② of the buttonhole 40 as shown in FIG. 11.

In case where the foot switch SF is continuously actuated when the address $AC_m'$ of the random access memory RAM is selected, the judge circuit JA and the address determination circuit AP function to repeat the operation in accordance with the data stored in the section LN of FIG. 9.

When the automatic mode buttonhole operation selection key KB is depressed at a time when the stitch formation is conducted to the point $40_a$ of FIG. 7 after passing the side ② the one-shot pulse generator qB develops the output signal QB to set the flip-flop $f_2$ and to reset the flip-flop $f_1$. The AND gates $A_6$ and $A_7$ are turned off to disable the indication lamp LA. The flip-flop $f_6$ is set to turn on the AND gate $A_8$, whereby the indication lamp LB is continuously enabled to indicate that the operation is changed to the automatic mode.

The signal $S_1$ is developed because of the provision of the output signal QB, whereby the section PB-1 of the read only memory ROM is selected. The data stored in the section PB-1 of the read only memory ROM are transferred to the random access memory RAM as shown in FIG. 8.

When the foot switch SF is actuated under these conditions, the stitch pattern formation is conducted in accordance with the data stored in the random access memory RAM in response to the synchronization signal $\beta$. When the stitch formation is advanced to the section nA of FIG. 8, the bit $B_o$ becomes "1" and, hence, the AND gate $A_3$ functions to transfer the synchronization signal $\beta$ toward the count-down circuit CDC in order to reduce the contents stored in the register ND one by one.

When the contents stored in the register ND reach zero (0), that is, when the stitch formation is conducted in the direction ① by the length $l_1$ preselected at the manual mode, the judge circuit JO develops the detection output "1" to turn on the AND gate $A_4$. The one-shot pulse generator qC develops the output signal QC to set the flip-flop $f_3$. At this moment the signal $S_2$ ($=F_5 \cdot QA + QC$) is developed to transfer the data stored in the section PB-2 of the read only memory ROM to the random access memory RAM. At the same time, the gate $G_1$ is turned on by the output signal QC to transfer the contents stored in the register NC to the register ND. In this way, the stitch formation is conducted in the direction ② of FIG. 7.

When the operation is advanced to the section LN, the AND gate $A_3$ functions to pass the synchronization signal $\beta$ to count down the contents stored in the register ND. At a time when the stitch formation is conducted to the point $40_a$, the contents stored in the register ND become zero (O). The judge circuit JO develops the detection output, and the one-shot pulse generator qC develops the signal QC. Accordingly, the AND gate $A_5$ develops a signal to reset the flip-flop $f_6$, whereby the indication lamp LB is driven to flicker at a frequency determined by the pulse signal SS. By this flickering of the indication lamp LB, the operator reorganizes that the buttonhole operation in the automatic mode is completed.

The output signal of the AND gate $A_5$ is also applied to the flip-flop $f_4$ to set it. The set output signal of the flip-flop $f_4$ is applied to the clutch solenoid 13 to turn off the clutch mechanism. The needle 3 is held stationary even though the main shaft 1 rotates. The stitch formation is not conducted till instructions are developed from the control panel. In this way, one cycle of the buttonhole operation is completed.

The buttonhole operation is performed without any guide plates, because the zigzag stitch length $l_1$ of the section PB-2 is automatically selected to equal that of the section PB-1.

If the automatic mode buttonhole operation is desired to be again performed, the automatic mode buttonhole operation selection key KB is again depressed. The signal QB is developed to set the flip-flop $f_6$. The AND gate $A_8$ is turned on to continuously enable the indication lamp LB. The flip-flop $f_3$ is reset. And, the signal $S_1$ is developed to transfer the digital data stored in the section PB-1 of the read only memory ROM to the random access memory RAM. Also, the gate $G_1$ is turned on to transfer the contents stored in the register NC to the register ND. Thus, the operation is similar to that discussed above.

(VII) OTHER EMBODIMENTS

Figure 13:
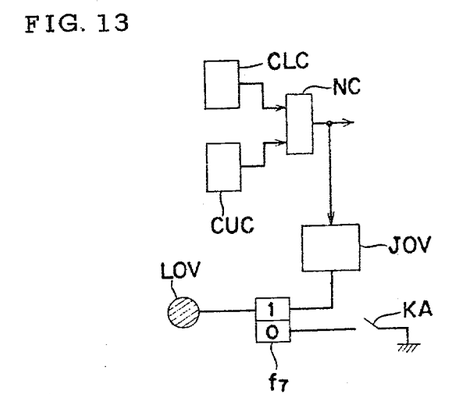
FIG. 13 is a block diagram of a portion of another embodiment of a control system of the automatic electronic sewing machine of the present invention.

In the embodiment of FIGS. 6(A) and 6(B), the buttonhole length $l_1$ is counted by the register NC. FIG. 13 shows a portion of another embodiment of the control system, which is applicable to the case where the buttonhole length exceeds the capacity of the register NC. Like elements corresponding to those of FIGS. 6(A) and 6(B) are indicated by like numerals.

A judge circuit JOV is connected to receive the output signal of the register NC to develop a detection output when the contents stored in the register NC exceeds the capacity of the register NC. The detection output signal of the judge circuit JOV is applied to a flip-flop $f_7$ to enable an alarm lamp LOV. When the alarm lamp LOV is enabled, the buttonhole operation must be performed in the manual mode only. The flip-flop $f_7$ is reset upon depression of the manual mode buttonhole operation selection key KA.

Figure 14:
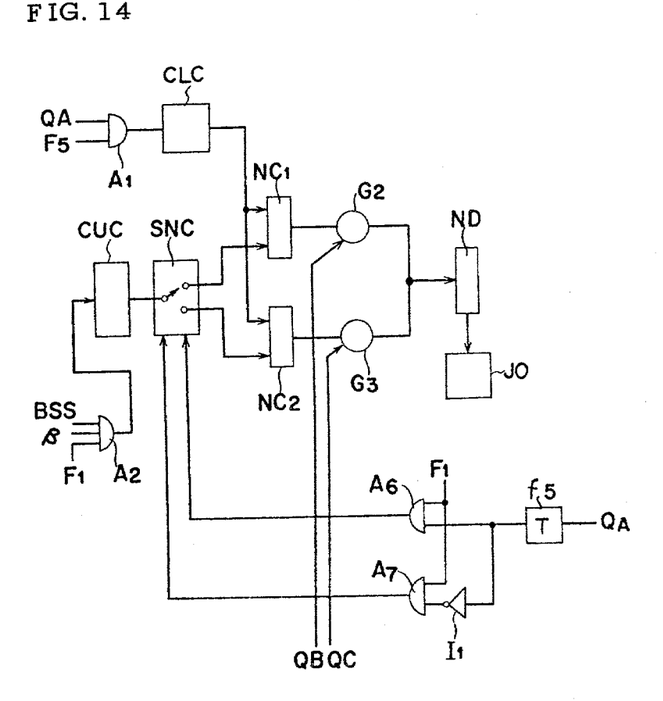
FIG. 14 is a block diagram of a portion of still another embodiment of a control system of the automatic electronic sewing machine of the present invention.

FIG. 14 shows still another embodiment of the control system, wherein the stitch formation length is varied in the direction ② as compared with that in the direction ① to compensate for the work slip. Like elements corresponding to those of FIGS. 6(A) and 6(B) are indicated by like numerals.

A register $NC_1$ stores the stitch number in the direction ①, and another register $NC_2$ stores the stitch number in the direction ②. An electronic switch SNC is provided for selectively applying the output signal of the count-up circuit CUC to the registers $NC_1$ and $NC_2$. Gates $G_2$ and $G_3$ are provided for controlling the application of the contents stored in the registers $NC_1$ and $NC_2$ to the register ND.

When the buttonhole operation is conducted in the direction ①, the set output signals $F_1$ and $F_5$ are "1" and, therefore, the AND gate $A_6$ is ON. At this moment, the electronic switch SNC is switched to the side of the register $NC_1$. Accordingly, the contents of the register $NC_1$ are increased in response to the synchronization signal $\beta$ when the zigzag stitch pattern is formed in the direction ①. In this way, the stitch number in the direction ① is stored in the register $NC_1$.

When the manual mode buttonhole operation selection key KA is again depressed, the stitch formation is conducted in the direction ② in accordance with the data stored in the section PB-2 of the read only memory ROM. At this moment, the AND gate $A_7$ is turned on and the AND gate $A_6$ is turned off. Therefore, the electronic switch SNC is switched to the side of the register $NC_2$, whereby the register $NC_2$ stores the stitch number.

Usually, the contents stored in the register $NC_2$ are greater than that stored in the register $NC_1$ by the amount corresponding to the work slip and the work slack. Under these conditions when the automatic mode buttonhole operation selection key KB is depressed, the one-shot pulse generator qB develops the output signal QB to turn on the gate $G_2$, thereby transferring the contents stored in the register $NC_1$ to the register ND.

The stitch formation is automatically conducted in the direction ① upon actuation of the foot switch SF. When the stitch formation is conducted by the number determined by the register ND, the judge circuit J0 develops the detection output, and the one-shot pulse generator qC develops the output signal QC. Accordingly, the gate $G_3$ is turned on to transfer the contents stored in the register $NC_2$ to the register ND. The stitch formation is conducted in the direction ② by the number determined by the contents stored in the register ND to complete the automatic mode buttonhole operation.

Upon completion of one cycle of the buttonhole operation, the clutch solenoid 13 is enabled to turn off the clutch mechanism. When the automatic mode buttonhole operation selection key KB is again depressed, the one-shot pulse generator qB is enabled to turn on the gate $G_2$. The contents stored in the register $NC_1$ are transferred to the register ND. Following operation is similar to that is discussed above.

Figure 15:
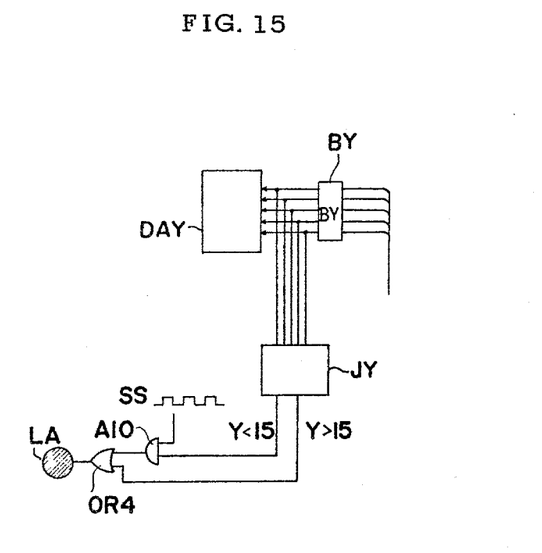
FIG. 15 is a block diagram of a portion of yet another embodiment of a control system of the automatic electronic sewing machine of the present invention.

FIG. 15 shows a portion of yet another embodiment of the control system of the present invention. Like elements corresponding to those of FIGS. 6(A) and 6(B) are indicated by like numerals.

The output signals of the register BY are introduced into a judge circuit JY, which judges whether the contents stored in the register BY are greater than fifteen (15) or smaller than fifteen (15). When the contents stored in the register BY are greater than fifteen (15), a signal Y>15 is applied to an OR gate $OR_4$. When the contents stored in the register BY are smaller than fifteen (15), a signal Y<15 is applied to an AND gate $A_{10}$. Another input terminal of the AND gate $A_{10}$ is connected to receive the pulse signal SS of the predetermined frequency. The output signal of the AND gate $A_{10}$ is applied to the OR gate $OR_4$, of which the output signal is applied to the indication lamp LA or the indication lamp LB.

The indication lamp LA is continuously enabled when the signal Y>15 is developed, or when the work feed plate 4 is driven to move in the positive direction. Contrarily, when the signal Y<15 is developed, or when the work feed plate 4 is driven to move in the negative direction, the indication lamp LA flickers at a frequency determined by the pulse signal SS.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an automatic electronic sewing machine having a buttonhole operation mode which produces a buttonhole having a major longitudinal dimension of a desired length with stitching along juxtaposed first and second edges of the major longitudinal dimension, said buttonhole being produced by shifting the position of a sewing machine needle relative to the medium to be sewn in response to an output signal of a control system, said control system comprising:
   first storage means for storing first digital data for conducting a first part of the buttonhole operation mode in a forward direction along said first edge and second digital data for conducting a second part of the buttonhole operation mode in a reverse direction along said second edge;
   first control means for reading out said first digital data stored in said first storage means and conducting the first part of said buttonhole operation mode in said forward direction;
   second control means for reading out said second digital data stored in said first storage means and conducting the second part of said buttonhole operation mode in said reverse direction;
   second storage means for storing information related to said desired length of said buttonhole; and
   third control means for controlling said desired length of said buttonhole in accordance with said information stored in said storage means.

2. The automatic electronic sewing machine of claim 1, wherein said buttonhole operation mode is completed by said second control means after completion of the first part of said buttonhole operation mode.

3. The automatic electronic sewing machine of claim 1, wherein said first storage means comprises a read only memory for storing digital data corresponding to the needle position relative to the medium to be sewn.

4. The automatic electronic sewing machine of claim 3, further including a first linear motor for shifting the needle position, a work feed plate, and a second linear motor for moving the work feed plate, and wherein said first and second control means comprise:
   random access memory means for temporarily storing said first and second digital data read out from said read only memory;
   digital-to-analog converter means for converting said first and second digital data temporarily stored in said random access memory to analog signals; and
   transfer means for applying siad analog signals to said first and second linear motors.

5. The automatic electronic sewing machine of claim 4, which further comprises:
   a synchronization signal generator for developing a synchronizing signal in response to penetration operation of the needle; and
   means for controlling reading out operation of said first and second digital data stored in said random access memory in synchronization with said synchronization signal.

6. The automatic electronic sewing machine of claim 5, wherein said second storage means comprises a register for storing the number of stitches needed to complete an edge of said buttonhole of a desired length.

7. The automatic electronic sewing machine of claim 6, wherein said third control means comprise:
   counter means for reducing the contents stored in said register in response to said synchronization signal; and a judge circuit for developing a detection output when the contents stored in said register reach zero, thereby completing the buttonhole operation in said reverse direction.

8. An automatic electronic sewing machine according to claim 1 further comprising:
indicator means for indicating whether said medium to be sewn is driven to move forward or backward.

9. The automatic electronic sewing machine of claim 8, wherein said indication means comprise an indicator lamp, and said automatic electronic sewing machine further comprises:
a detection means for developing a first control signal when said medium to be sewn is driven to move forward, and developing a second control signal when said medium to be sewn is driven to move backward; and
driver means for activating said indicator lamp in response to said first and second control signals so that the direction the medium to be sewn is driven is indicated visually by said indicator lamp.

10. The automatic electronic sewing machine of claim 9, wherein said driver means continuously activates said indicator lamp when said first control signal is developed, and intermittently activates said indicator lamp when said second control signal is developed.

11. In an automatic electronic sewing machine having a buttonhole operation mode which produces a buttonhole composed of individual stitches of a constant size not affected by the buttonhole length having a major longitudinal dimension of a desired length with stitching along juxtaposed first and second edges of the major longitudinal dimension, said buttonhole being produced by shifting the position of a sewing machine needle relative to the medium to be sewn in order to produce individual stitches in response to an output signal of a control system, said control system comprising:
first storage means for storing first digital data for conducting the buttonhole operation mode in a forward direction along said first edge and storing second digital data for conducting the buttonhole operation mode in a reverse direction along said second edge;
control means for selectively reading selected portions of said first and second digital data from said first storage means and controlling the shifting of the needle position in response thereto, the selected portion of said first digital data defining a given number of stitches which collectively determine the buttonhole length, the selected portion of said second digital data defining a given number of stitches equal to the number of stitches defined by the selected portion of said first digital data.

12. The automatic sewing machine of claim 11 wherein said control system further comprises:
second storage means for storing buttonhole length data corresponding to the desired buttonhole length along said longitudinal dimension, said second storage means instructing said control means to read out the selected portions of said first an second digital data; and
wherein the selected portion of said first digital data in said first storage means is set by a user command which also introduces the buttonhole length data into said second storage means.

13. The automatic sewing machine of claim 12 wherein the selected portion of said second digital data in said first storage means is set by the buttonhole length data of said second storage means.

14. The automatic sewing machine of claim 11 wherein said control system further comprises:
second storage means for storing buttonhole length data corresponding to the desired buttonhole length along said longitudinal dimension, said second storage means instructing said control means to read out the selected portions of said first and second digital data; and
wherein the selected portions of said first and second digital data in said first storage means are set by said buttonhole length data of said second storage means.

15. In an automatic electronic sewing machine having a buttonhole operation mode which produces buttonholes having a major longitudinal dimension of a desired length with stitching along juxtaposed first and second edges of the major longitudinal dimension, said buttonholes being produced by shifting the position of a sewing machine needle in order to produce individual stitches in response to a control system, said control system comprising:
means for calibrating the length of said buttonholes by manually controlling the buttonhole operation mode until the first edge of the first buttonhole achieves the desired length and storing a buttonhole length signal representative of this desired length; and
means for automatically continuing the buttonhole operation mode along the second edge until said buttonhole length signal determines that the buttonhole operaion mode is completed.

16. The automatic electronic sewing machine control of claim 15 wherein said control system further comprises:
means for automatically repeating said buttonhole operation mode to produce a plurality of buttonholes by using said buttonhole length signal generated by said means for calibrating to determine the length of said buttonholes.

17. A method of controlling an electronic sewing machine having a buttonhole operation mode which produces buttonholes having a major longitudinal dimension of a desired length with stitching along juxtaposed first and second edges of the major longitudinal dimension, said buttonholes being produced by shifting the position of a sewing machine needle in order to produce individual stitches, comprising the steps of:
calibrating the length of said buttonholes by manually controlling the buttonhole operation mode until the first edge of the first buttonhole is the desired length and storing a buttonhole length signal representative of this desired length; and
automatically continuing the buttonhole operation mode along the second edge until said buttonhole length signal determines that the buttonhole operation mode is completed.

18. The method of controlling the buttonhole operation of claim 17 comprising the further step of:
automatically repeating said buttonhole operation mode to produce a plurality of buttonholes by using said buttonhole length signal to determine the length of said buttonholes.

* * * * *